United States Patent [19]

Grandvallet et al.

[11] Patent Number: 5,804,058
[45] Date of Patent: Sep. 8, 1998

[54] CATALYTIC DEWAXING PROCESSES USING ALUMINA FREE COATED CATALYST

[75] Inventors: Pierre Grandvallet; Laurent Georges Huve, both of Grand Couronne, France; Theodorus Ludovicus Michael Maesen, Amsterdam, Netherlands

[73] Assignee: Shell Oil Company, Houston, Tex.

[21] Appl. No.: 662,596

[22] Filed: Jun. 13, 1996

[30] Foreign Application Priority Data

Jun. 13, 1995 [EP] European Pat. Off. ............. 95401379

[51] Int. Cl.$^6$ .................................................. C10G 47/04
[52] U.S. Cl. ........................ 208/171; 208/27; 208/110; 208/112; 208/108; 208/109
[58] Field of Search ............................. 208/27, 111, 110, 208/112, 109, 108

[56] References Cited

U.S. PATENT DOCUMENTS

| | | |
|---|---|---|
| 4,088,605 | 5/1978 | Rollmann . |
| 4,343,692 | 8/1982 | Winquist ................................ 208/211 |
| 4,501,926 | 2/1985 | LaPierre et al. ....................... 585/739 |
| 4,518,485 | 5/1985 | LaPierre et al. ........................... 208/89 |
| 4,820,402 | 4/1989 | Partridge et al. ....................... 208/111 |
| 4,867,861 | 9/1989 | Abdo et al. ............................... 208/27 |
| 4,961,836 | 10/1990 | Murphy .................................. 208/111 |
| 5,084,159 | 1/1992 | Abdo et al. ............................. 208/109 |
| 5,157,191 | 10/1992 | Bowes et al. . |
| 5,242,676 | 9/1993 | Apelian et al. . |
| 5,284,573 | 2/1994 | LaPierre et al. ......................... 208/89 |

FOREIGN PATENT DOCUMENTS

| | | |
|---|---|---|
| 82019 | 6/1983 | European Pat. Off. . |
| 188898 | 7/1986 | European Pat. Off. . |
| 313276 | 4/1989 | European Pat. Off. . |

OTHER PUBLICATIONS

Search Report of Feb. 10, 1996.

*Primary Examiner*—Walter D. Griffin
*Assistant Examiner*—Nadine Preisch
*Attorney, Agent, or Firm*—Kim Muller

[57] ABSTRACT

A process is disclosed for the catalytic dewaxing of a hydrocarbon oil feed comprising waxy molecules, which process comprises:

contacting a feed under catalytic dewaxing conditions with a catalyst composition comprising a molecular sieve containing crystallites covalently bound alumina moieties in its framework and having pores with a diameter in the range of from 0.35 to 0.80 nm and recovering a product having a reduced pour point, wherein the molecular sieve has been modified to reduce the mole percentage of alumina by coating the surface of the crystallites with a refractory inorganic oxide which is essentially free of alumina.

14 Claims, No Drawings

CATALYTIC DEWAXING PROCESSES USING ALUMINA FREE COATED CATALYST

FIELD OF THE INVENTION

The present invention relates to catalytic dewaxing processes and to catalyst compositions suitable for dewaxing hydrocarbon oils containing waxy molecules.

BACKGROUND OF THE INVENTION

The expression "catalytic dewaxing" is commonly applied in the art and refers to reducing the content of waxy molecules in a hydrocarbon feedstock by contacting this feedstock with hydrogen in the presence of a suitable catalyst. The expression "waxy molecules" refers to molecules comprising a linear or slightly branched long chain aliphatic moiety, such as linear and slightly branched long chain paraffins, long chain alkyl-aromatics and long chain alkyl-naphthenics. Catalytic dewaxing can be attained by cracking and/or isomerization of the waxy molecules. To that end dedicated selective cracking catalysts and dedicated selective isomerization catalysts are available. It will be appreciated that a selective cracking catalyst mainly promotes cracking reactions, whereby also some isomerization occurs, while a selective isomerization catalyst mainly promotes isomerization of waxy molecules, whereby also some cracking occurs. The extent wherein cracking and/or isomerization occurs also depends on the reaction conditions applied and the type of feed used.

Several dewaxing catalysts and catalytic dewaxing processes are known in the art. For instance, in U.S. Pat. No. 4,917,789 a process for the catalytic dewaxing of hydrocarbon oils is disclosed wherein the hydrocarbon oil feed is contacted with a crystalline silica polymorph silicalite catalyst at such mild dewaxing conditions that the C3 and lower hydrocarbon gas make is 2% by weight based on feed or lower. The dewaxing step may be preceded by a hydrotreatment step in order to remove sulphur from the feed or, alternatively, may be followed by a hydrotreatment step. The catalytic dewaxing process is particularly suitable for producing low pour point gas oil and diesel oil fractions. In these cases, the dewaxing step is suitably preceded by a hydrodesulphurization step.

In European Patent Application No. 313,276 a catalytic dewaxing process is disclosed, wherein a waxy hydrocarbon oil is contacted with an extruded low acidity refractory oxide-bound intermediate pore size zeolite-based catalyst composition under appropriate dewaxing conditions. The catalyst may contain a hydrogenation component, such as platinum. Suitable low acidity binder materials include silica, germanium dioxide, titanium dioxide and zirconium dioxide, of which silica is the preferred binder material. The low acidity refractory oxide-bound intermediate pore size zeolite-based catalyst is shown to exhibit an improved activity and stability in catalytic dewaxing operations as compared with the same type of zeolite bound with an acidic binder such as alumina. Suitable zeolites have a pore diameter of greater than 0.5 nm and a Constraint Index of between 1 and 12 and include several ZSM-type zeolites, including ZSM-5 and ZSM-35. In the working examples the production of lube oil products having pour points of $-6.7°$ C. and $-3.9°$ C. was demonstrated.

In U.S. Pat. No. 5,139,647 a catalytic dewaxing process for producing low pour point middle distillates (gas oil) as well as low pour point lubricating base oils is disclosed, wherein a hydrocarbon oil feed having a 90% boiling point above $316°$ C. ($600°$ F.) is contacted under hydrocracking conditions with a catalyst comprising an intermediate pore size silicoaluminophosphate (SAPO) molecular sieve and a hydrogenation component. A very suitable catalyst is Pd/SAPO-11. In this dewaxing process the long-chain paraffin molecules present in the feed undergo mild cracking reactions, while at the same time isomerization of n-paraffins into isoparaffins occurs. After dewaxing the effluent is separated into the middle distillate fraction and the heavier lubricating oil base stock. The latter is subsequently advantageously subjected to a hydrofinishing treatment in order to hydrogenate any olefins, diolefins and aromatics present. Such hydrofinishing step is beneficial for the stability of the final lubricating base oil.

In International Patent Application No. WO 92/01657 a catalytic dewaxing process is disclosed wherein a hydrocarbon oil feed containing straight and slightly branched paraffins having 10 or more carbon atoms is contacted under isomerization conditions with a catalyst comprising (i) an intermediate pore size molecular sieve having a crystallite size of at most 0.5 micron, a certain acidity and isomerization selectivity and pores with a diameter in the range of from 0.48 nm to 0.71 nm and (ii) at least one Group VIII metal, suitably platinum and/or palladium. Among the many suitable molecular sieves are listed ZSM-5, ZSM-22, ZSM-23, ZSM-35, SSZ-32, ferrierite and SAPO-11. A subsequent hydrofinishing step to increase the lube oil product's stability may be applied. In the working examples lube oil products having a pour point of $-12°$ C. and a viscosity index of from 102 to 107 are shown to be obtainable by the process disclosed.

In International Patent Application No. WO 92/01769 a catalytic dewaxing process is disclosed wherein a waxy feed having a wax content of more than 50% by weight and/or having a pour point of above $0°$ C. and containing more than 70% of paraffinic carbon is contacted with a catalyst comprising a molecular sieve having oval shaped pores and at least one Group VIII metal. Suitable feedstocks include slack waxes obtained from hydrocracked or solvent refined lube oils. Suitable molecular sieves include SAPO-11, SAPO-31, SAPO-41,ZSM-22, ZSM-23 and ZSM-35. Preferred catalysts are Pt/SAPO-11 and Pt/ZSM-22. The process is stated to be suitable for the production of lube oils having pour points of below $-24°$ C. and viscosity indices of between 125 and 180. An additional hydrofinishing step may be applied to increase the stability of the lube oil product obtained.

In U.S. Pat. No. 5,149,421 a catalytic dewaxing process is described wherein a hydrocarbon oil having a boiling range above $177°$ C. and containing straight and slightly branched paraffins is contacted sequentially with a layered catalyst comprising a catalyst layer containing an intermediate pore size SAPO molecular sieve and a hydrogenation component (suitably Pt/SAPO-11) and a catalyst layer containing an intermediate pore size aluminosilicate zeolite and optionally a hydrogenation component. The intermediate pore size aluminosilicate zeolite is suitably selected from the group of ZSM-22, ZSM-23 and ZSM-35,while platinum or palladium is used as the hydrogenation component.

BRIEF DESCRIPTION OF THE INVENTION

Although the processes listed above perform satisfactory in many respects, there is still room for improvement. The present invention aims to provide a catalytic dewaxing process, wherein hydrocarbon oil products having greatly reduced pour points and very low cloud points can be produced at high yields thereby using a catalyst composition exhibiting an optimum combination of stability, selectivity and activity, so that it can be used for a long duration without significant deactivation occurring. The present invention aims to provide such process which can be applied for dewaxing both gas oils and lubricating base oils. Furthermore, the present invention aims to provide a catalytic dewaxing process wherein the gas make can be kept at a low level and wherein the by-products formed are valuable products like naphtha and gas oil. The present invention also aims to provide a tailor made catalyst composition having excellent stability, selectivity and activity when applied in catalytic dewaxing operations.

DETAILED DESCRIPTION OF THE INVENTION

Accordingly, the present invention relates to a process for the catalytic dewaxing of a hydrocarbon oil feed comprising waxy molecules, which process comprises the steps of:
(a) contacting the feed under catalytic dewaxing conditions with a catalyst composition comprising a molecular sieve containing covalently bound alumina moieties in its framework and having pores with a diameter in the range of from 0.35 to 0.80 nm, and
(b) recovering a product having a reduced pour point,
wherein the molecular sieve has been modified to reduce the mole percentage of alumina.

The hydrocarbon oils to be used as feed in the process according to the present invention should contain waxy molecules. Minimum wax content of a hydrocarbon oil feed should be 5% by weight based on total feed, preferably at least 7.5% by weight. Concrete examples of suitable feeds, then, include waxy distillate fractions substantially boiling between 250° and 620° C., i.e. having at least 90% by weight of their boiling range between 250° and 620° C., which waxy distillate fractions are obtained by either atmospheric distillation or distillation under reduced pressure. Vacuum distillate fractions derived from an atmospheric residue, i.e. distillate fractions obtained by vacuum distillation of a residual fraction which in return is obtained by atmospheric distillation of a crude oil, are particularly suitable feedstocks. The boiling range of such a vacuum distillate fraction is usually for at least 90% by weight of the hydrocarbons present between 250° and 620° C., suitably between 350° and 550° C. An example of a suitable vacuum distillate fraction is a vacuum gas oil. Hydroprocessed waxy distillate fractions are also very suitable feedstocks and examples include hydrotreated atmospheric or vacuum gas oils and hydrocracked vacuum gas oils. Deasphalted residual oil fractions, including both deasphalted atmospheric residues and deasphalted vacuum residues, may also be applied, while synthetic waxy raffinates (Fischer-Tropsch waxy raffinates) and hydrocracker bottom fractions (hydrowax), i.e. those fractions having an effective cutpoint of at least 320° C., preferably at least 360° C., are also suitable feedstocks to be used in the process according to the present invention. Slack waxes obtained from the dewaxing of hydroprocessed or solvent refined waxy distillates may also be suitably applied as feedstocks in the process according to the present invention. In general, for lubricating base oil application, wax content of the hydrocarbon oil feed will normally be at least 10% by weight, more suitably at least 15% by weight. If lubricating base oils having viscosity indices above 120 and particularly above 135 are to be prepared, feedstocks containing relatively high amounts of waxy molecules, i.e. feeds having a wax content of at least 50% by weight, preferably at least 80% by weight and more preferably at least 90% by weight, such as the aforementioned synthetic waxy raffinates, hydrowaxes or slack waxes, are suitably used as the feedstock.

Catalytic dewaxing conditions are known in the art and typically involve operating temperatures in the range of from 200° to 500° C., suitably from 250° to 400° C., hydrogen pressures in the range of from 10 to 200 bar, suitably from 15 to 100 bar, more suitably from 15 to 65 bar, weight hourly space velocities (WHSV) in the range of from 0.1 to 10 kg of oil per liter of catalyst per hour (kg/l/hr), suitably from 0.2 to 5 kg/l/hr, more suitably from 0.5 to 3 kg/l/hr and hydrogen to oil ratios in the range of from 100 to 2,000 liters of hydrogen per liter of oil.

The catalyst composition to be used in the process of the present invention comprises a molecular sieve having pores with a diameter in the range of from 0.35 to 0.80 nm and containing covalently bound alumina moieties, which molecular sieve has been modified to reduce the overall mole percentage of these alumina moieties. The diameter as used in this connection refers to the maximum pore diameter. As is generally recognized, the pores in a molecular sieve are polygonal channels having a minimum and a maximum pore diameter. For the purpose of the present invention the maximum pore diameter is the critical parameter, because it determines the size of the waxy molecules which can enter the pores. The expression "alumina moiety" as used in this connection refers to an $Al_2O_3$-unit which is part of the framework of the molecular sieve, i.e. which has been incorporated via covalent bindings with other oxide moieties, such as silica ($SiO_2$), in the framework of the molecular sieve. The mole percentage of alumina present in the molecular sieve is defined as the percentage of moles $Al_2O_3$ relative to the total number of moles of oxides constituting the molecular sieve (prior to modification) or modified molecular sieve (after modification). In other words, the mole percentage of alumina is the percentage of alumina moieties relative to the total number of oxide moieties constituting the molecular sieve or modified molecular sieve.

Modification of the molecular sieve to reduce the mole percentage of alumina basically implies that the number of acid sites is reduced. This can be achieved in various ways. A first way is applying a coating of a low acidity inorganic refractory oxide onto the surface of the crystallites of the molecular sieve. Suitable inorganic oxides for this purpose are silica, zirconia or titania, of which silica is preferred. By applying such coating onto the crystallites' surface, the total number of oxide moieties in the modified molecular sieve (i.e. the original molecular sieve plus the coating) is increased, while the number of alumina moieties remains the same, thus resulting in a reduced mole percentage of alumina. An major advantage of this method is that the number of acid sites on the surface of the crystallites of the molecular sieve is drastically reduced to essentially zero, thus allowing the waxy molecules to penetrate into the crystallites, where the desired reactions can occur, rather than initiating immediate cracking of the waxy molecules upon contact with the crystallites. The occurrence of such immediate cracking is undesired, because it causes a relatively high gas make, i.e. the formation of light gaseous hydrocarbons, which increases at the cost of the yield of both dewaxed product and potentially useful by-products, such as naphtha, kerosene and gas oil.

Another very useful way of modifying the molecular sieve is by subjecting it to a dealumination treatment. In general, dealumination of the crystallites of a molecular sieve refers to a treatment, whereby aluminium atoms are either withdrawn from the molecular sieve framework leaving a defect or are withdrawn and replaced by other atoms, such as silicon, titanium, borium, germanium or zirconium. Dealumination can be attained by methods known in the art. Particularly useful methods are those, wherein the dealumination is claimed to occur selectively at the surface of the crystallites of the molecular sieve. In this way, namely, the same effect as with the coated molecular sieves can be attained: the number of acid sites at the surface of the crystallites is reduced, so that the phenomenon of cracking reactions occurring as soon as the waxy molecules come into contact with the crystallites can be significantly reduced, thereby allowing the waxy molecules to enter the crystallites for the desired reactions to occur. As explained above, this positively influences the yield of both dewaxed product and useful by-products.

Modification of the molecular sieve by dealumination is in practice particularly useful for aluminosilicate zeolites. Molecular sieves constituted by oxide moieties other than silica and alumina will in practice be difficult to dealuminate by the methods presently available due to interference of these other oxide moieties with the dealuminating agent. This applies in particular to molecular sieves containing phosphorus like the SAPO-11, SAPO-31 and SAPO-41. For such materials modification by coating as described hereinbefore is therefore required.

In U.S. Pat. No. 5,157,191 a very suitable process for dealuminating the surface of an aluminosilicate zeolite is described wherein the zeolite is contacted with an aqueous solution of a hexafluorosilicate salt, most advantageously ammonium hexafluorosilicate, to extract the aluminium atoms located at the surface of the zeolite and replace these atoms with silicon atoms. In said U.S. patent several hydrocarbon conversion reactions including shape-selective oligomerization of olefins to produce high viscosity lube oils, cracking, isomerization of xylene, disproportionation of toluene and alkylation of aromatics, are described in which the surface modified zeolite could be useful as a catalyst. However, no reference is made to catalytic dewaxing nor to loading the surface modified zeolite with a hydrogenation component.

Another method for dealuminating the surface of zeolite crystallites is disclosed in U.S. Pat. No. 5,242,676. According to this method a zeolite is contacted with a dicarboxylic acid, suitably in the form of an aqueous solution, for sufficient time to effect at least 40% reduction in surface acidity with less then 50% overall dealumination. A very suitable dicarboxylic acid is oxalic acid, while suitable zeolites should have a Constraint Index of greater than 1 and include ZSM-5, ZSM-11, ZSM-22, ZSM-23, ZSM-35, MCM-22 and MCM-49.

The dealumination of the aluminosilicate zeolite results in a reduction of the number of alumina moieties present in the zeolite and hence in a reduction of the mole percentage of alumina. A very good measure for the reduction of the mole percentage of alumina is the increase of the silica to alumina ($SiO_2/Al_2O_3$) molar ratio of the zeolite as a result of the dealumination treatment. For the purpose of the present invention, the dealumination ratio, which is defined as the ratio of $SiO_2/Al_2O_3$ molar ratio of surface dealuminated zeolite (i.e. after dealumination) to $SiO_2/Al_2O_3$ molar ratio of starting zeolite (i.e. before dealumination), is suitably in the range of from 1.1 to 3.0, preferably from 1.3 to 2.5 and even more preferably from 1.5 to 2.2. Selective dealumination of the surface of the zeolite crystallites, accordingly, also results in a reduction of the number of surface acid sites of the zeolite crystallites, while not affecting the internal structure of the zeolite crystallites. The extent of dealumination of the surface of the crystallites depends on the severity of the dealumination treatment. Suitably, the number of surface acid sites of the zeolite is reduced with at least 70%, preferably with at least 80% and even more preferably with at least 90%. In a most preferred embodiment the number of surface acid sites is reduced with essentially 100% by the selective dealumination, thus leaving essentially no surface acid sites at all. Without wishing to be bound by any particular theory it is believed that due to the selective dealumination of the crystallite surface the acidity of the inner part of the crystallites remains substantially unaffected and that it is this particular configuration which results in catalysts having excellent catalytic dewaxing activity, selectivity and stability.

The crystallite size of the zeolite is not particularly critical and may be as high as 100 micron. However, for an optimum catalytic activity it is preferred to employ crystallites having a size of between 0.1 and 50 micron, more preferably between 0.2 and 20 micron, while very good results have been obtained with crystallites having a size of between 0.5 and 5 micron.

The dewaxing catalyst composition used in the present process suitably also comprises a binder material which does not introduce acidity into the modified molecular sieve. In case of a dealuminated aluminosilicate zeolite, this implies that the binder should not re-acidify the dealuminated surface of the zeolite crystallites. Accordingly, if used at all, a binder should be used, which is essentially free of aluminium. A low acidity refractory oxide, which is essentially free of aluminium, is particularly suitable for this purpose. Suitable binder materials, then, include low acidity refractory oxides such as silica, zirconia, titanium dioxide, germanium dioxide, boria and mixtures of two or more of these. The most preferred binder, however, is silica. If present, the weight ratio of modified molecular sieve to binder is suitably within the range of from 10/90 to 90/10, preferably from 20/80 to 80/20 and most preferably from 50/50 to 80/20.

In addition to the modified molecular sieve and optionally the binder material, the catalyst composition may also comprise a hydrogenation component. Particularly when used as a dewaxing catalyst in the manufacture of lubricating base oils, the presence of a hydrogenation component in the catalyst composition is advantageous. The hydrogenation component suitably comprises at least one Group VIB metal component and/or at least one Group VIII metal component. Group VIB metal components include tungsten, molybdenum and/or chromium as sulphide, oxide and/or in elemental form. If present, a Group VIB metal component is suitably present in an amount of from 1 to 35% by weight, more suitably from 5 to 30% by weight, calculated as element and based on total weight of support, i.e. modified molecular sieve plus optional binder. Group VIII metal components include those components based on both noble and non-noble metals. Particularly suitable Group VIII metal components, accordingly, are palladium, platinum, nickel and/or cobalt in sulphidic, oxidic and/or elemental form. Group VIII non-noble metals, if present at all, may be present in an amount in the range of from 1 to 25% by weight, preferably 2 to 15% by weight, calculated as element and based on total weight of support. The total amount of Group VIII noble metal will normally not exceed 5% by weight calculated as element and based on total weight of support, and preferably is in the range of from 0.2 to 3.0% by weight. If both platinum and palladium are present, the weight ratio of platinum to palladium may vary within wide limits, but suitably is in the range of from 0.05 to 10, more suitably 0.1 to 5. Catalysts comprising palladium and/or platinum as the hydrogenation component are preferred.

Molecular sieves which can be applied in the dewaxing catalyst composition must in any event meet the pore diameter requirements as given hereinbefore, i.e. they must have pores with a maximum diameter in the range of from 0.35 to 0.80 nm, preferably from 0.45 to 0.75 nm. For the purpose of the present invention it is preferred to employ aluminosilicate molecular sieves, i.e. molecular sieves of which the framework consists exclusively of silica and alumina moieties. In case the molecular sieve is modified by dealumination, it has to meet the additional requirement of being susceptible to dealumination and more particularly to selective dealumination at the surface of its crystallites. Further characteristics of the molecular sieves are determined by their desired function, i.e. selective cracking of waxy molecules, selective isomerization of waxy molecules or a combination of both.

In one embodiment of the present invention the dewaxing catalyst is predominantly selective for cracking of waxy molecules. The word "predominantly" as used in this connection indicates that the main role of the catalyst is to promote cracking of the waxy molecules into smaller molecules, whereby some isomerization will inevitably occur as well. Examples of suitable zeolites, then, include MFI-type zeolites having pores with diameters of 0.55 and 0.56 nm, such as ZSM-5 and silicalite, offretite having pores with diameters of approximately 0.68 nm and zeolites of the ferrierite group having pores with diameter of 0.54 nm, such as ZSM-35 and ferrierite. ZSM-23 and SSZ-32, both having a pore diameter of 0.52 nm, may also be applied. Of these, ferrierite, ZSM-5 and mixtures thereof are preferred.

In another embodiment of the present invention, the dewaxing catalyst composition is predominantly selective for isomerizing waxy molecules to produce more branched molecules. Here, the word "predominantly" indicates that the main role of the catalyst is to promote isomerization of the waxy molecules into more branched molecules, whereby some cracking will inevitably occur as well. Examples of suitable molecular sieves are, for instance, listed in International Patent Applications Nos. 92/01657 and 92/01769, U.S. Pat. No. 4,810,356 and European Patent Application No. 0,313,276 and include inter alia the aluminosilicates mordenite, zeolite beta, silicalite, ZSM-22, ZSM-23, ZSM-38, ZSM-48, ZSM-57, SSZ-24, SSZ-32, SSZ-26, SSZ-33 and MCM-22 and mixtures of two or more of these. For coated embodiments, molecular sieves based on aluminophosphates like SAPO-11, SAPO-31 and SAPO-41 may also be used. As has already been mentioned hereinbefore, the aluminophosphate-based materials cannot be used if the modification of the molecular sieve to reduce its mole percentage of alumina involves a surface dealumination treatment. Preferably, the molecular sieve used in a selective isomerization catalyst is an aluminosilicate containing pores having a diameter of from 0.50 to 0.80 nm. Mordenite (0.70 nm), zeolite beta (0.55 and 0.76 nm), ZSM-23 and SSZ-32 (both 0.52 nm), are very suitable molecular sieves.

In a further preferred embodiment of the present invention catalytic dewaxing of a hydrocarbon oil feed is attained by a combination of isomerization and cracking. Accordingly, the present invention also relates to a process for the catalytic dewaxing of a hydrocarbon oil feed comprising waxy molecules, which process comprises the steps of:

(a1) contacting the hydrocarbon oil feed under isomerization conditions with a selective isomerization catalyst, (a2) contacting the product of step (a1) under cracking conditions with a selective cracking catalyst composition comprising a modified molecular sieve and optionally a low acidity refractory oxide binder and/or a hydrogenation component, as has been described in detail hereinbefore, and (b) recovering a product having a reduced pour point.

In a preferred embodiment of the above process, the selective isomerization catalyst used in step (a1) is also a catalyst composition comprising a modified molecular sieve and optionally a low acidity refractory oxide binder and/or a hydrogenation component.

Isomerization conditions and cracking conditions applied in step (a1) and (a2), respectively, are known in the art and are similar to the catalytic dewaxing conditions described hereinbefore.

Without wishing to be bound by any particular theory it is believed that in the isomerization step (a1) the waxy molecules present in the hydrocarbon oil feed are allowed to enter at least partially the micropores of the isomerization catalyst. Under the isomerization conditions applied the waxy molecules, which are able to enter the pores of the shape selective isomerization catalyst, will be converted into isomerized molecules and to some extent lighter cracked molecules, whereas the other molecules present in the feed will remain unmodified. The linear waxy molecules, which are the least reactive molecules and which are partly responsible for the undesired cold flow properties, such as high pour points and high cloud points, will be only partially converted, so that the effluent from the hydro-isomerization step will still contain a significant amount of linear waxy molecules. These molecules are subsequently selectively converted by contacting them with the surface deactivated selective cracking catalyst, thus leading to a significant improvement of the cold flow properties, particularly to a substantial reduction of the pour point.

Very good results can, accordingly, be obtained when the shape selective isomerization catalyst applied in step (a1) comprises larger pores than the catalytic dewaxing catalyst applied in the subsequent selective cracking step (a2). In such configuration, namely, the mechanism described above can function in an optimum way. A very advantageous configuration comprises for instance a modified mordenite-based selective isomerization catalyst in step (a1) and a selective cracking catalyst based on modified ZSM-5 and/or ferrierite-based in step (a2). When manufacturing lubricating base oils it is preferred to use in step (a1) a modified selective isomerization catalyst containing a hydrogenation component. The selective cracking catalyst used in step (a2) may also comprise a hydrogenation component in that case, but the presence of such hydrogenation component has no significant impact in terms of product yield and product properties.

The above process of combined isomerization and cracking may be conveniently carried out in a series flow mode using two separate reactors, whereby the feed is first passed through the reactor comprising a bed of shape selective hydro-isomerization catalyst (step (a1)) and thereafter is passed through a second reactor comprising a bed of selective cracking catalyst (step (a2)). Alternatively, both steps of this process may be carried out in one single reactor using a stacked bed configuration with a bed of shape selective isomerization catalyst on top of a bed of selective cracking catalyst. Still another option may be to apply a physical mixture of the shape selective catalyst and the selective cracking catalyst in one single catalyst bed.

The present invention also relates to a dewaxing catalyst composition comprising a hydrogenation component on a support comprising a molecular sieve containing covalently bound alumina moieties in its framework and having pores with a diameter in the range of from 0.35 to 0.80 nm, whereby the molecular sieve has been modified to reduce its mole percentage of alumina. As described hereinbefore, the catalyst composition suitably also comprises a binder material which will not re-acidify the deactivated surface of the zeolite crystallites. Preferred binder materials are low acidity refractory oxides, of which silica is the most preferred option. Preferred aluminosilicate zeolites are ZSM-5, ferrierite and mixtures thereof as well as mordenite, zeolite beta, SSZ-32 and ZSM-23. The hydrogenation component present comprises at least one Group VIB metal component and/or at least one Group VIII metal component. Group VIB metal components include tungsten, molybdenum and/or chromium as sulphide, oxide and/or in elemental form. Group VIII metal components include those components based on both noble and non-noble metals. Particularly suitable Group VIII metal components, accordingly, are palladium, platinum, nickel and/or cobalt in sulphidic, oxidic and/or elemental form. Catalysts comprising palladium and/or platinum as the hydrogenation component are preferred.

In a final aspect the present invention relates to a dewaxing catalyst composition which is free of any hydrogenation component and which comprises (surface) dealuminated ferrierite crystallites. The catalyst composition preferably also comprises a silica binder.

EXAMPLES

The invention is further illustrated by the following examples without restricting the scope of the present invention to these specific embodiments.

In the tables given in the working examples the following abbreviations are used: ppmw refers to parts per million on a weight basis; % wt refers to percent by weight, Vk40 and Vk100 refer to the kinematic viscosity at 40° C. and 100° C., respectively, and are expressed in centiStokes, cSt; VI stands for viscosity index and IBP and FBP refer to initial boiling point and final boiling point, respectively.

Example 1

A surface dealuminated ferrierite catalyst was prepared according to the following procedure. 3800 ml of a 0.11N ammonium hexafluorosilicate solution were added to a zeolite-water slurry containing 120 grams of ferrierite ($SiO_2$/$Al_2O_3$ molar ratio of 11.7) and 1700 ml deionised water. The reaction mixture was heated to 100° C. and maintained at this temperature for one night. The product was washed with deionised water, dried for 2 hours at 120° C. and then calcined for 2 hours at 480° C. The surface dealuminated ferrierite thus obtained had a $SiO_2$/$Al_2O_3$ molar ratio of 22.3, so that the dealumination ratio was 1.9. Subsequently the surface dealuminated ferrierite was extruded with a silica binder (70% by weight of ferrierite, 30% by weight of silica binder). The extrudates were dried at 120° C. and calcined at 500° C.

A hydrotreated heavy straight run gasoil having the properties as listed in Table I was contacted in the presence of hydrogen with the surface dealuminated, silica-bound ferrierite at a temperature of 290° C., an outlet pressure of 55 bar, a weight hourly space velocity (WHSV) of 0.7 kg/l.hr and a gas rate of 500 Nl/kg.

The results are given in Table II.

TABLE I

Properties of hydrotreated heavy straight run gasoil

| Density 20/4 | 0.860 | Boiling point distribution (% wt) | |
| --- | --- | --- | --- |
| Sulphur (ppmw) | 350 | <295° C. | 10 |
| Nitrogen (ppmw) | 47 | 295–360° C. | 40 |
| Pour point (°C.) | +6 | 360–410° C. | 40 |
| n-paraffin (% wt) | 9.6 | >410° C. | 10 |

TABLE II

Product characteristics

| Yield (% wt) | 89.4 | Gas make (% wt) | 6.1 |
| --- | --- | --- | --- |
| Density 20/4 | 0.867 | Pour point (°C.) | −27 |
| Vk40 (cSt) | 9.9 | Cloud point (°C.) | −26 |

From Table II it can be seen that the use of a surface dealuminated, silica-bound ferrierite as dewaxing catalyst for gasoil resulted in a pour point reduction of as much as 33° C. and a cloud point of −26° C. at low gas make and high product yield.

Example 2

A hydrocracked waxy raffinate having the properties as listed in Table III was contacted in the presence of hydrogen with the surface dealuminated, silica-bound ferrierite catalyst described in Example 1 at a temperature of 305° C., an outlet pressure of 40 bar, a WHSV of 1.0 kg/l.hr and a gas rate of 700 Nl/kg.

The results are given in Table IV.

Table IV shows that the surface dealuminated, silica-bound ferrierite is also very useful as a dewaxing catalyst in the manufacture of lubricating base oils. A pour point reduction of 35° C. is excellent, while the product yield and gas make are also very good. As can be seen, the reduction in VI due to the dewaxing has been kept limited so that the product also has a good VI.

TABLE III

Properties of hydrocracked waxy raffinate

| Density 70/4 | 0.821 | Boiling point distribution (% wt) | |
| --- | --- | --- | --- |
| Vk40 (cSt) | 21.6 | IBP-360° C. | 10 |
| Vk100 (cSt) | 4.43 | 360–420° C. | 40 |
| VI | 116 | 420–470° C. | 40 |
| Sulphur (ppmw) | <1 | 470-FBP °C. | 10 |
| Nitrogen (ppmw) | <1 | | |
| Pour point (°C.) | +33 | IBP (°C.) | 300 |
| Wax content (% wt) | 19.3 | FBP (°C.) | 514 |

TABLE IV

Product characteristics

| Yield (% wt) | 82 | Gas make (% wt) | 7 |
| --- | --- | --- | --- |
| Vk40 (cSt) | 25.1 | Pour point (°C.) | −2 |
| Vk100 (cSt) | 4.66 | VI | 101 |

Example 3

A surface dealuminated, silica bound ZSM-5 catalyst (70% wt surface dealuminated ZSM-5, 30% wt silica binder) was prepared in a similar way as described in Example 1 starting from a zeolite-water slurry containing 42 grams of ZSM-5 and 590 grams of deionised water. Prior to surface dealumination the ZSM-5 had a $SiO_2/Al_2O_3$ molar ratio of 26.0, afterwards of 51.6, which corresponds with a dealumination ratio of 2.0.

A hydrocracked waxy raffinate having the properties as listed in Table V was contacted in the presence of hydrogen with the surface dealuminated, silica-bound ZSM-5 at a temperature of 295° C., an outlet pressure of 40 bar, a WHSV of 1.0 kg/l.hr and a gas rate of 700 Nl/kg.

The results are given in Table VI.

From Table VI it can be seen that the surface dealuminated, silica bound ZSM-5 catalyst is an excellent dewaxing catalyst (pour point reduction of 44° C.). The product obtained, accordingly, has an excellent pour point, while kinematic viscosity and VI are also very good, thus making the product particularly useful as lubricating base oil. Furthermore, gas make and product yield are within commercially acceptable limits.

TABLE V

Properties of hydrocracked waxy raffinate

| Density 7014 | 0.817 | Boiling point distribution (% wt) | |
|---|---|---|---|
| Vk40 (cSt) | 21.8 | IBP-380° C. | 10 |
| Vk100 (cSt) | 4.51 | 380–420° C. | 40 |
| VI | 121 | 420–470° C. | 40 |
| Sulphur (ppmw) | 2.9 | 470-FBP °C. | 10 |
| Nitrogen (ppmw) | <1 | | |
| Pour point (°C.) | +27 | IBP (°C.) | 334 |
| Wax content (% wt) | 16.7 | FBP (°C.) | 538 |

TABLE VI

Product characteristics

| Yield (% wt) | 73 | Gas make (% wt) | 16 |
|---|---|---|---|
| Vk40 (cSt) | 28.0 | Pour point (°C.) | −17 |
| Vk100 (cSt) | 5.01 | VI | 104 |

Example 4

A surface dealuminated, silica bound ZSM-5 as described in Example 3 was loaded with platinum by contacting said modified ZSM-5 with a solution of platinum tetramine hydroxide in deionised water (8.5 mg of platinum tetramine hydroxide per ml deionised water) for 16 hours. The product was filtered, washed with deionised water, dried for 2 hours at 120° C. and calcined for 2 hours at 300° C. Reduction of the platinum was subsequently carried out under a hydrogen rate of 100 l/hr at a temperature of 350° C. for 2 hours.

A hydrocracked waxy raffinate having the properties as listed in Table V was contacted in the presence of hydrogen with the platinum-loaded, surface dealuminated, silica-bound ZSM-5 at a temperature of 300° C., an outlet pressure of 40 bar, a WHSV of 1.0 kg/l.hr and a gas rate of 700 Nl/kg.

The results are given in Table VII.

TABLE VII

Product characteristics

| Yield (% wt) | 80 | Gas make (% wt) | 7 |
|---|---|---|---|
| Vk40 (cSt) | 28.0 | Pour point (°C.) | −18 |
| Vk100 (cSt) | 5.1 | VI | 100 |

From Table VII it can be seen that the dewaxing performance of the catalyst is excellent (reduction in pour point of 45° C.), resulting in a product having a pour point of −18° C. Since kinematic viscosity and VI of the product are also very good, the product is very useful as lubricating base oil. Again, product yield and gas make are well in line with commercial demands.

What we claim as our invention:

1. In a process for the catalytic dewaxing of a hydrocarbon oil feed consisting essentially of a gas oil and a lubricating base oil, wherein both have waxy molecules therein, which process comprises the steps of:
    (a) contacting the feed under catalytic dewaxing conditions with a catalyst composition comprising a molecular sieve containing crystallites covalently bound alumina moieties in its framework and having pores with a diameter in the range of from 0.35 to 0.80 nm, wherein said crystallites have a surface, and
    (b) recovering a product having a reduced pour point, wherein the improvement of the process consists of modifying said molecular sieve to reduce the mole percentage of alumina by coating said surface of said crystallites with a refractory inorganic oxide which is essentially free of alumina.

2. A process according to claim 1 wherein the molecular sieve is an aluminosilicate zeolite which has been modified by subjecting it to a dealumination treatment.

3. A process according to claim 2 wherein the mutual ratio of the $SiO_2/Al_2O_3$ molar ratio of the zeolite after dealumination to the $SiO_2/Al_2O_3$ molar ratio of the zeolite before dealumination, is in the range of from 1.1 to 3.0.

4. A process according to claim 1 wherein the catalyst composition also comprises a low acidity refractory oxide binder material which is essentially free of alumina.

5. A process according to claim 1 wherein the catalyst composition comprises a hydrogenation component.

6. A process according to claim 1 wherein the catalyst composition is predominantly selective for cracking of waxy molecules.

7. A process according to claim 6 wherein the catalyst composition comprises a molecular sieve selected from the group consisting of ZSM-5, ferrierite and mixtures thereof.

8. A process according to claim 1 wherein the catalyst composition is predominantly selective for isomerizing waxy molecules.

9. A process according to claim 8, wherein the catalyst composition comprises a molecular sieve selected from the group consisting of ZSM-23, SSZ-32 and mordenite.

10. A process according to claim 1 for the catalytic dewaxing of a hydrocarbon oil feed comprising waxy molecules, wherein the catalyst composition in said process is a combination of isomerization and cracking, which said process comprises the steps of:
    (a1) contacting the hydrocarbon oil feed under isomerization conditions with a selective isomerization catalyst composition,
    (a2) contacting the product of step (a1) under cracking conditions with a selective cracking catalyst composition, and (b) recovering a product having a reduced pour point.

11. A process according to claim 10 wherein the selective isomerization catalyst composition used in step (a1) is a catalyst composition selected from the group consisting of ZSM-23, SSZ-32 and mordenite.

12. A process according to claim 11 wherein process steps (a1) and (a2) are carried out in a series flow mode or stacked bed configuration with a first bed of selective isomerization catalyst above a second bed of selective cracking catalyst.

13. A process according to claim 10 wherein the molecular sieve present in the selective isomerization catalyst composition used in step (a1) comprises larger pores than the molecular sieve present in the selective cracking catalyst used in step (a2).

14. A process according to claim 4, wherein the low acidity refractory oxide binder material is silica.

* * * * *